(12) United States Patent
Kato et al.

(10) Patent No.: US 7,995,119 B2
(45) Date of Patent: Aug. 9, 2011

(54) INFORMATION RECORDING APPARATUS, NON-CONTACT RECORDING MEDIUM AND RECORDING METHOD FOR THE SAME

(75) Inventors: Tetsuro Kato, Kanagawa (JP); Hideki Ando, Kanagawa (JP); Jun Sawai, Kanagawa (JP); Tsutomu Shimosato, Tokyo (JP)

(73) Assignee: Sony Corporation, Tokyo (JP)

( * ) Notice: Subject to any disclaimer, the term of this patent is extended or adjusted under 35 U.S.C. 154(b) by 1315 days.

(21) Appl. No.: 11/555,925

(22) Filed: Nov. 2, 2006

(65) Prior Publication Data

US 2007/0154162 A1    Jul. 5, 2007

(30) Foreign Application Priority Data

Nov. 16, 2005    (JP) .................................. 2005-331932

(51) Int. Cl.
H04N 5/225    (2006.01)
(52) U.S. Cl. .................................................... 348/231.9
(58) Field of Classification Search .......... 386/224–228; 348/231.9, 231.99
See application file for complete search history.

(56) References Cited

U.S. PATENT DOCUMENTS

| | | | |
|---|---|---|---|
| 6,952,573 B2 * | 10/2005 | Schucker et al. | 455/333 |
| 7,092,022 B1 * | 8/2006 | Brake | 348/333.01 |
| 7,194,038 B1 * | 3/2007 | Inkinen et al. | 375/259 |
| 7,447,779 B2 * | 11/2008 | Fujii | 709/227 |
| 7,525,569 B2 * | 4/2009 | Schmidt | 348/64 |
| 7,610,024 B2 * | 10/2009 | Laroia et al. | 455/101 |
| 7,619,657 B2 * | 11/2009 | Watanabe et al. | 348/211.2 |
| 7,728,871 B2 * | 6/2010 | Renkis | 348/143 |
| 7,733,371 B1 * | 6/2010 | Monroe | 348/153 |
| 7,757,958 B2 * | 7/2010 | Ito | 235/492 |
| 7,822,277 B2 * | 10/2010 | Aleksic | 382/232 |
| 2001/0006902 A1 * | 7/2001 | Ito | 455/558 |
| 2002/0065044 A1 * | 5/2002 | Ito | 455/41 |
| 2004/0196375 A1 * | 10/2004 | Marshall | 348/207.1 |

FOREIGN PATENT DOCUMENTS

| | | | |
|---|---|---|---|
| JP | 10-215394 | * | 8/1998 |
| JP | 2000-285207 | | 10/2000 |
| JP | 2001-236474 | | 8/2001 |
| JP | 2002-354384 | | 12/2002 |
| JP | 2002-374446 | * | 12/2002 |
| JP | 2004-310596 | * | 11/2004 |
| JP | 2004-362523 | | 12/2004 |

OTHER PUBLICATIONS

Katagishi, Machine generated translation of JP 2004-310596, Nov. 2004.*

* cited by examiner

*Primary Examiner* — David E Harvey
(74) *Attorney, Agent, or Firm* — Oblon, Spivak, McClelland, Maier & Neustadt, L.L.P.

(57) ABSTRACT

An information recording apparatus with a capability of recording information to a plurality of non-contact recording media within a communicable range of the apparatus body, the apparatus including: a medium loading portion into which a non-contact recording medium is removably loaded; a medium detector configured to detect that a non-contact recording medium has been loaded in the medium loading portion; a first antenna for sending and receiving information to and from the non-contact recording medium loaded in the medium loading portion; a second antenna for sending and receiving information to and from the non-contact recording medium removed from the medium loading portion; and antenna switch for switching between the first antenna and the second antenna according to the detection output from the medium detector.

5 Claims, 5 Drawing Sheets

INFORMATION RECORDING APPARATUS, NON-CONTACT RECORDING MEDIUM AND RECORDING METHOD FOR THE SAME

CROSS REFERENCES TO RELATED APPLICATIONS

The present invention contains subject matter related to Japanese Patent Application P2005-331932 filed in the Japanese Patent Office on Nov. 16, 2005, the entire contents of which being incorporated herein by reference.

BACKGROUND OF THE INVENTION

1. Field of the Invention

The invention relates to an information recording apparatus with a capability of recording information to a plurality of non-contact recording media within a communicable range of the apparatus body, a non-contact recording medium and a recording method of the same.

2. Description of the Related Art

There are provided non-contact recording media, such as a wireless storage device in which an information instrument is wirelessly connected to a storage disk to read and write data, and an IC card using an induced electromagnetic field to read and write data (see JP-A-2004-362523 and JP-A-2001-236474, for example).

In a camcorder of related art in which a camera and an image recorder are integrated, a recording medium is either built in or electrically and mechanically connected. Therefore, when a plurality of recording media can be simultaneously handled, each of the media is identified before recording, so that it is easy to select one particular medium. However, when a recording medium is handled as a wireless storage device separated from the camcorder body and there are a plurality of recording media within a communicable range, it is necessary to distinguish and select which recording medium is used for recording.

SUMMARY OF THE INVENTION

In the wireless storage device described in JP-A-2004-362523, however, unique information as identification information is written in a ROM area in the storage device prior to use by means of dedicated software, so that a writing environment (apparatus) separate from the apparatus body is necessary to use a new storage device. Furthermore, only when the writing apparatus notifies the provided information to the apparatus body that uses storage devices, the apparatus body can distinguish individual storage devices. Moreover, the operator may not be able to intuitively know which storage device is used for recording.

In the IC card described in JP-A-2001-236474, the apparatus body first communicates with the IC card at a low transmission power, and then the apparatus body recognizes that the IC card is within a proximate area. Thereafter, the apparatus body sets the transmission power to a higher level for data communication. However, there may be a plurality of IC cards within a range communicable at the lower power. In this case, normal communication may not be able to be established.

In view of the above problems of the related art, it is desirable to provide an information recording apparatus with a capability of recording information to a plurality of non-contact recording media within a communicable range of the apparatus body as well as distinguishing and selecting which medium is used for recording when there are a plurality of recording media within the communicable range.

Other objects of the invention and specific advantages obtained therefrom will become more apparent from the following description of an embodiment.

According to an embodiment of the invention, there is provided an information recording apparatus with a capability of recording information to a plurality of non-contact recording media within a communicable range of the apparatus body, the apparatus including a medium loading portion into which a non-contact recording medium is removably loaded, a medium detector configured to detect that a non-contact recording medium has been loaded in the medium loading portion, a first antenna for sending and receiving information to and from the non-contact recording medium loaded in the medium loading portion, a second antenna for sending and receiving information to and from the non-contact recording medium removed from the medium loading portion, an antenna switch configured to switch between the first antenna and the second antenna according to the detection output from the medium detector, and a communication unit configured to communicate with the non-contact recording medium using the first antenna or the second antenna via the antenna switch, wherein the non-contact recording medium loaded in the apparatus body is authenticated and provided with identification information via the first antenna, while for non-contact recording media removed from the apparatus body, at least one non-contact recording medium is selected from a plurality of non-contact recording media within a communicable range of the second antenna based on the provided identification information so as to record/reproduce or delete information.

According to another embodiment of the invention, there is provided a non-contact recording medium to which information is recorded using an information recording apparatus with a capability of recording information to a plurality of non-contact recording media within a communicable range of the apparatus body, the non-contact recording medium including loading detector configured to detect that the non-contact recording medium has been loaded in a medium loading portion of the information recording apparatus, a first antenna that allows the non-contact recording medium loaded in the medium loading portion to send and receive information to and from the information recording apparatus, a second antenna that allows the non-contact recording medium removed from the medium loading portion to send and receive information to and from the information recording apparatus, an antenna switch configured to switch between the first antenna and the second antenna according to the detection output from the loading detector, a communication unit configured to communicate with the information recording apparatus using the first antenna or the second antenna via the antenna switch, an identification information storing unit configured to store identification information provided from the information recording apparatus in an authentication process during communication between the non-contact recording medium loaded in the medium loading portion and the information recording apparatus via the first antenna using the communication unit, and information storing unit configured to record/reproduce or delete information to, from or in the non-contact recording medium selected based on the identification information provided from the information recording apparatus during communication between the non-contact recording medium removed from the medium loading portion and the information recording apparatus via the second antenna using the communication unit.

According to another embodiment of the invention, there is provided a recording method for a non-contact recording medium to which information is recorded using an information recording apparatus with a capability of recording information to a plurality of non-contact recording media within a communicable range of the apparatus body, the method including the steps of: determining whether or not a non-contact recording medium has been loaded in the information recording apparatus and switching between a first antenna switch for proximity-range communication and a second antenna for short-range communication according to the determination result; storing identification information in an identification information storing unit in the non-contact recording medium loaded in the information recording apparatus, the identification information provided from the information recording apparatus in an authentication process; and recording/reproducing or deleting information to, from or in an information storing unit in the non-contact recording medium removed from the information recording apparatus, the non-contact recording medium selected based on the identification information provided from the information recording apparatus during communication between the non-contact recording medium and the information recording apparatus.

According to the embodiment of the invention, authentication of the non-contact recording medium loaded in the medium loading portion of the information recording apparatus can be performed via the first antenna. The apparatus body thus recognizes individual non-contact recording media, so that not only can the user positively recognize each non-contact recording medium as in the case where the user himself/herself loads each non-contact recording medium in the information recording apparatus, but also the information recording apparatus can be of a lighter weight and a smaller volume by separating the non-contact recording medium from the apparatus body when recording, thereby providing easier operations.

Furthermore, the information recording apparatus can recognize a plurality of non-contact recording media prior to use, so that when the capacity of one recording medium is reached, the recording can be continuously resumed by using another recording medium that can be individually and positively recognized.

When the information recording apparatus recognizes a non-contact recording medium, the medium can be placed as proximate as possible to the apparatus body, so that the authentication process can be performed not only based on a communication code or a physical shape, but also based on various physical phenomena in combination, such as change in capacitance, change in magnetic characteristic, change in brightness and color recognition, thereby providing a strong authentication capability using an authentication method that is intuitively easy to the user.

Use of non-contact recording media ensures reliable recording without losing electrical contact even in demanding environments due to, for example, dust, sand, gas and humidity.

DESCRIPTION OF THE PREFERRED EMBODIMENTS

An embodiment of the invention will be described below in detail with reference to the drawings. The invention is of course not limited to the following embodiment but any changes can be made thereto as long as they do not depart from the spirit of the invention.

Figure 1:
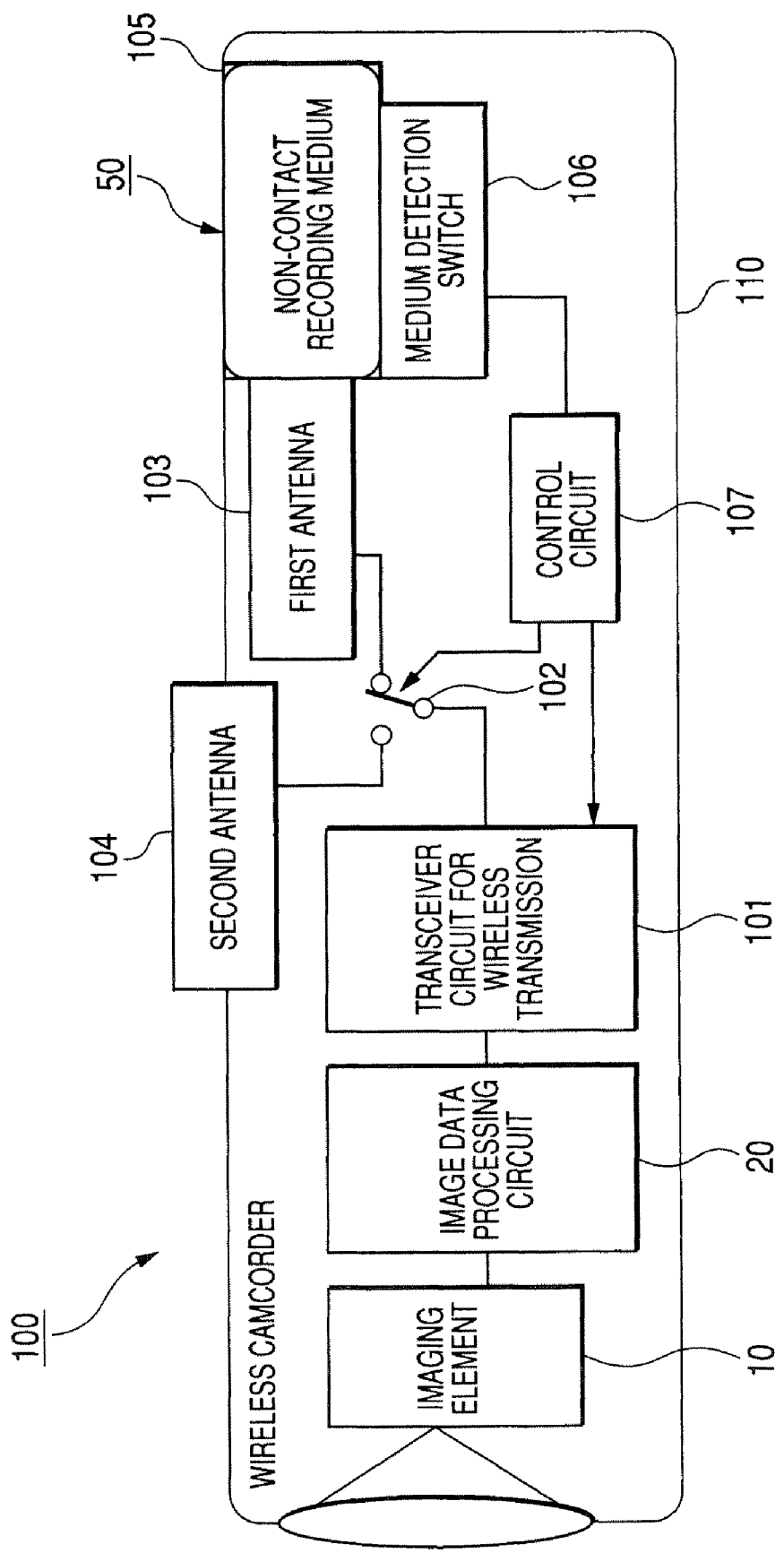
FIG. 1 is a block diagram showing the configuration of the information recording apparatus to which the invention is applied.

The invention is applied, for example, to an information recording apparatus 100 configured as shown in FIG. 1.

The information recording apparatus 100 is a camcorder in which a recording medium, such as a hard disk drive and a semiconductor memory, is used with a camera for acquiring video images. The information recording apparatus 100 includes not only typical camcorder components for imaging and recording a subject, such as an imaging element 10 and an image data processing circuit 20, but also a transceiver circuit for wireless-transmission 101, a first antenna 103 and a second antenna 104 that are selectively connected to the transceiver circuit for wireless-transmission 101 via an antenna selection switch 102, a medium loading portion 105 into which a non-contact recording medium 50 is removably loaded, a medium detection switch 106 that detects that a non-contact recording medium 50 has been loaded in the medium loading portion 105, a control circuit 107 that switches the antenna selection switch 102 according to the detection output from the medium detection switch 106, and the like.

The first antenna 103 is a proximity-range communication antenna for sending and receiving information to and from the non-contact recording medium 50 loaded in the medium loading portion 105. The first antenna 103 is, for example, a microstrip line antenna with a limited propagation characteristic, by which the first antenna 103 can communicate only with one non-contact recording medium 50 loaded in the medium loading portion 105 and hence placed in proximity to the first antenna 103.

The medium loading portion 105 is configured such that only one non-contact recording medium 50 can be removably loaded within a communicable range of the first antenna 103.

The second antenna 104 is a short-range communication antenna for sending and receiving information to and from the non-contact recording medium 50 removed from the medium loading portion 105. An antenna for wireless communication compliant with UWB or IEEE 802.11b is used for this purpose.

The control circuit 107 controls the antenna selection switch 102 according to the detection output from the medium detection switch 106 that detects that a non-contact recording medium 50 has been loaded in the medium loading portion 105, such that the first antenna 103 is selected when the non-contact recording medium 50 is loaded in the medium loading portion 105, while the second antenna 104 is selected when the non-contact recording medium 50 is removed from the medium loading portion 105.

Figure 2:
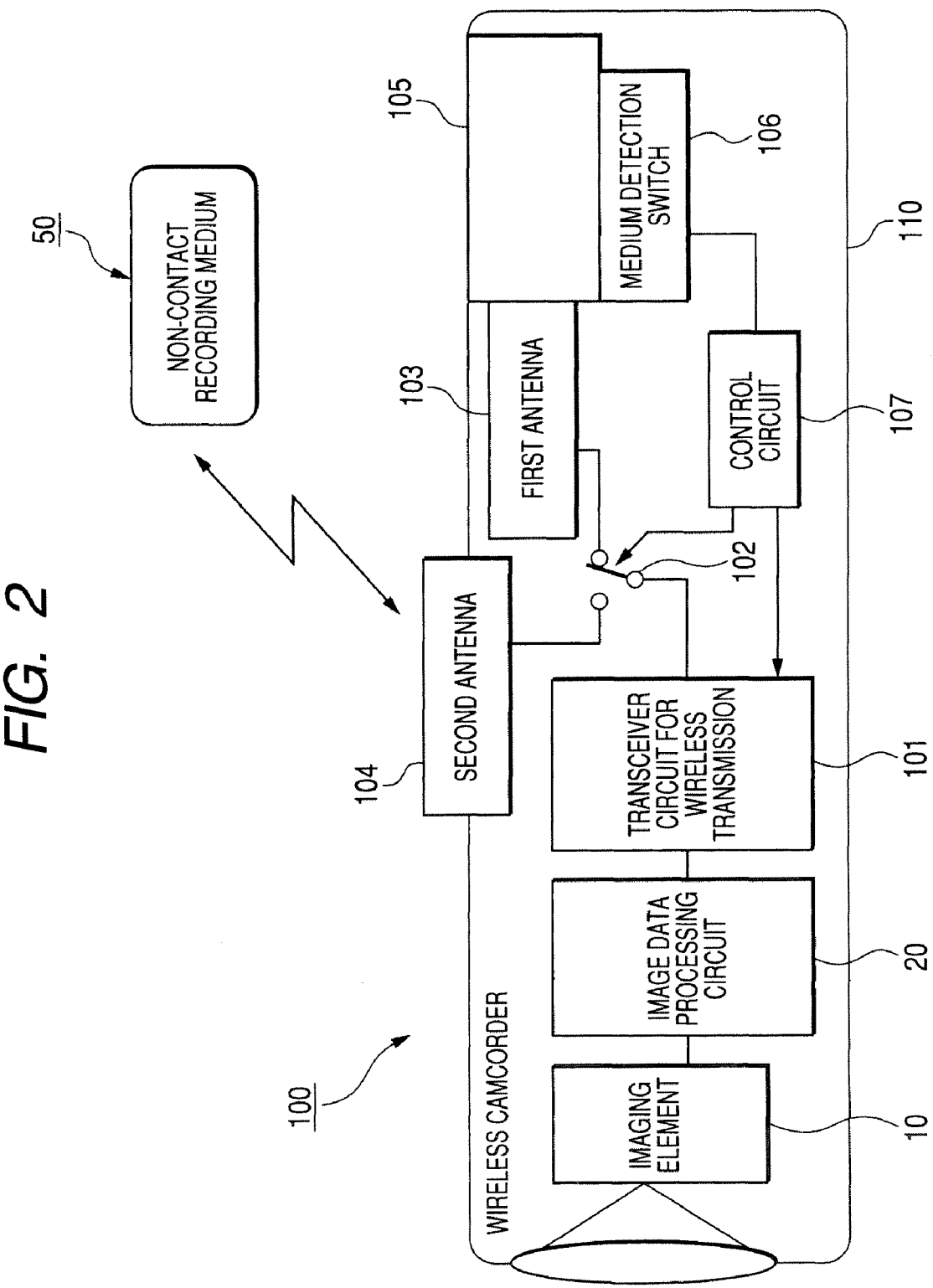
FIG. 2 is a block diagram showing the information recording apparatus with the non-contact recording medium removed from the apparatus body.

In the information recording apparatus 100, the transceiver circuit for wireless-transmission 101 communicates with the non-contact recording medium 50 using the first antenna 103 or the second antenna 104 via the antenna selection switch 102, such that the non-contact recording medium 50 loaded in the medium loading portion 105 of the apparatus body 110 is authenticated and provided with identification information via the first antenna 103, as shown in FIG. 1, while for non-contact recording media 50 removed from the apparatus body 110, at least one non-contact recording medium is selected from a plurality of non-contact recording media within a communicable range of the second antenna 104 based on the identification information so as to record/reproduce or delete information, as shown in FIG. 2.

Figure 3:
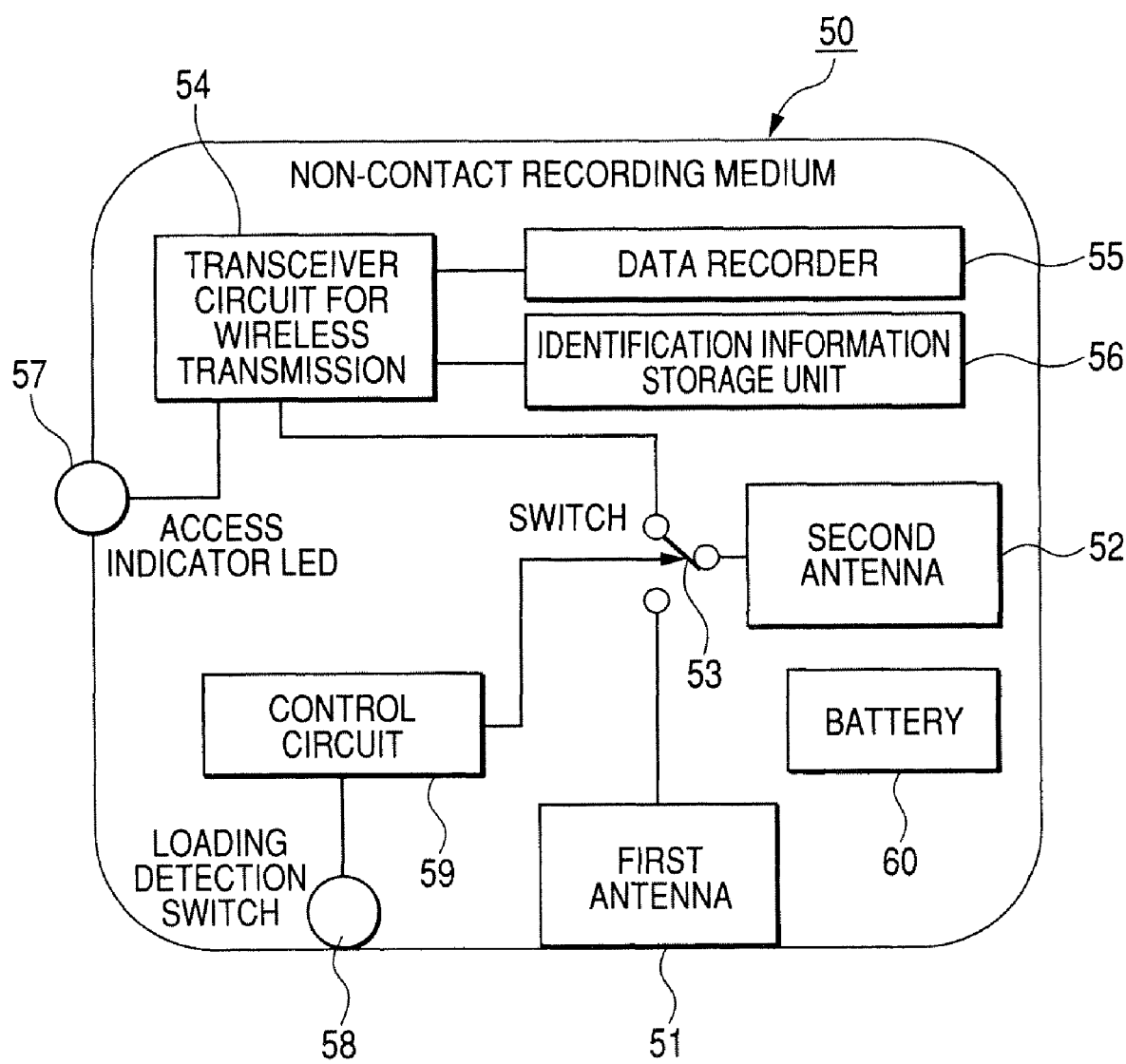
FIG. 3 is a block diagram showing the configuration of the non-contact recording medium.

The non-contact recording medium 50, for example as shown in FIG. 3, includes a first antenna 51, a second antenna 52, a transceiver circuit for wireless-transmission 54 that is selectively connected to the first antenna 51 or the second antenna 52 via an antenna selection switch 53, a data recorder 55 connected to the transceiver circuit for wireless-transmission 54, an identification information storage unit 56 and an access indicator 57, a loading detection switch 58 that detects that the non-contact recording medium 50 has been loaded in the medium loading portion 105 of the information recording apparatus 100, a control circuit 59 that switches the antenna selection switch 53 according to the detection output from the loading detection switch 58, and the like.

The first antenna 51 is a proximity-range communication antenna that allows the non-contact recording medium 50 loaded in the medium loading portion 105 to send and receive information to and from the information recording apparatus 100. The first antenna 51 is, for example, a microstrip line antenna that is electromagnetically connected to the first antenna 103 of the information recording apparatus 100 that comes in proximity to the non-contact recording medium 50 when it is loaded in the medium loading portion 105.

The second antenna 52 is a short-range communication antenna that allows the non-contact recording medium 50 removed from the medium loading portion 105 of the information recording apparatus 100 to send and receive information to and from the information recording apparatus 100. An antenna for wireless communication compliant with UWB or IEEE 802.11b is used for this purpose.

The control circuit 59 controls the antenna selection switch 53 according to the detection output from the loading detection switch 58 that detects that the non-contact recording medium 50 has been loaded in the medium loading portion 105 of the information recording apparatus 100, such that the first antenna 51 is selected when the non-contact recording medium 50 is loaded in the medium loading portion 105, while the second antenna 52 is selected when the non-contact recording medium 50 is removed from the medium loading portion 105.

In the non-contact recording medium 50, when the non-contact recording medium 50 is loaded in the medium loading portion 105 of the information recording apparatus 100, the first antenna 51 is selected by the antenna selection switch 53 and the transceiver circuit for wireless-transmission 54 communicates with the information recording apparatus 100 via the first antenna 51 and stores identification information, which is provided in an authentication process via the first antenna 51, in the identification information storage unit 56, as shown in FIG. 1, while when the non-contact recording medium 50 is removed from the medium loading portion 105 of the information recording apparatus 100, the second antenna 52 is selected by the antenna selection switch 53 and the transceiver circuit for wireless-transmission 54 communicates with the information recording apparatus 100 via the second antenna 52 and records/reproduces or deletes information to, from or in the data recorder 55, as shown in FIG. 2.

When the non-contact recording medium 50 is removed from the information recording apparatus 100, data is transmitted via the second antenna 52. However, when there are a plurality of non-contact recording media in a proximate area, the access indicator 57 will blink during data transmission, so that the user can distinguish which medium is sending and receiving data. The non-contact recording medium 50 is powered by a built-in battery 60 or an electromagnetic field transmitted in a non-contact manner.

Figure 4:
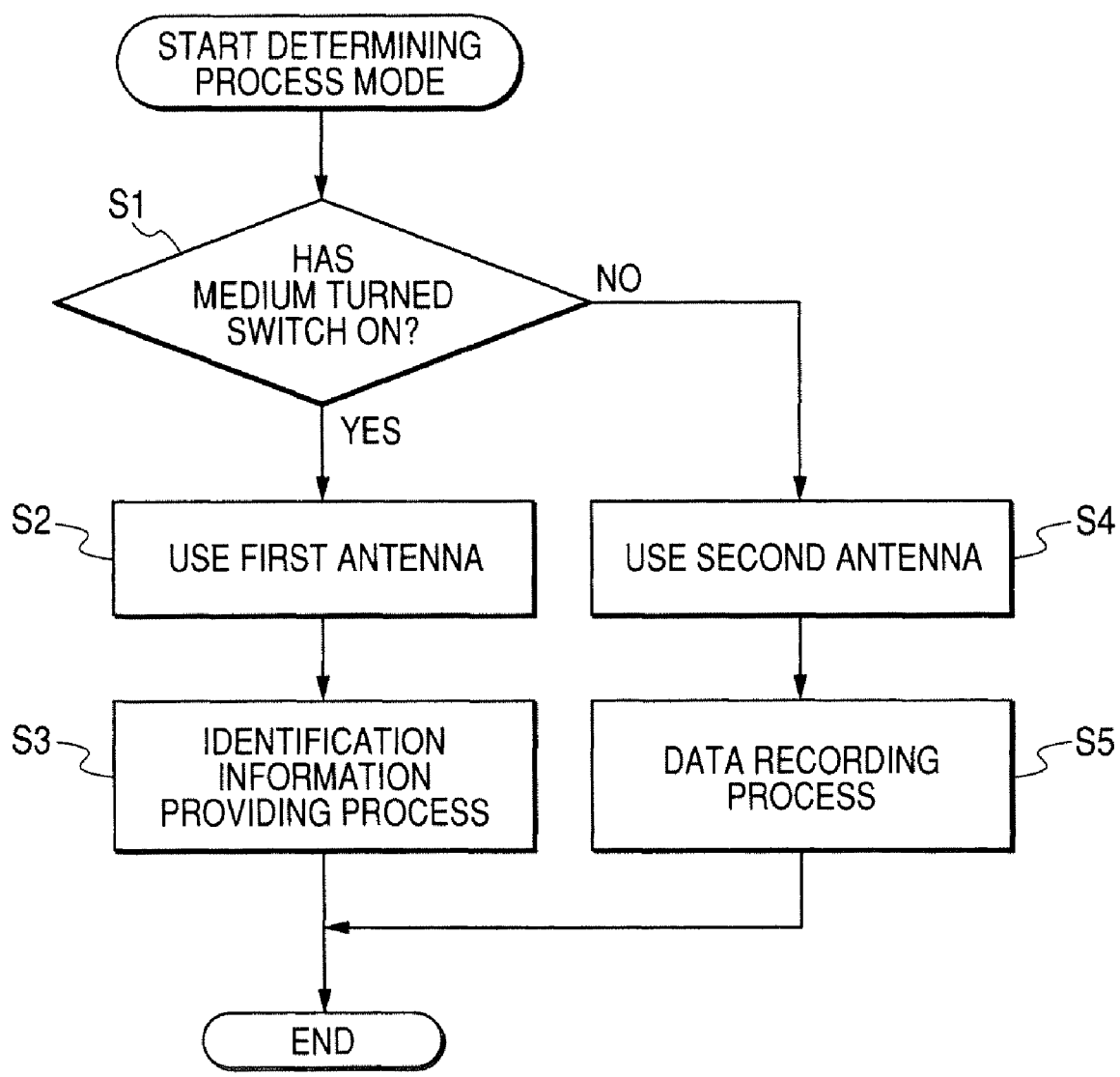
FIG. 4 is a flowchart showing the operations of the information recording apparatus.

That is, the information recording apparatus 100 records/reproduces or deletes information to, from or in such a non-contact recording medium 50 by performing the following steps shown in the flowchart of FIG. 4: determining whether or not a non-contact recording medium 50 has been loaded in the medium loading portion 105 of the apparatus body 110 (step S1); selecting the first antenna 103 via the antenna selection switch 102 when the determination result in step S1 is YES, that is, when the medium detection switch 106 detects that the non-contact recording medium 50 has been loaded in the medium loading portion 105 (step S2); and using the first antenna 103 to perform authentication and provide identification information (step S3). In this way, the apparatus body authenticates the non-contact recording medium and provides identification information prior to use, so that the apparatus body identifies individual non-contact recording media.

When the determination result in step S1 is NO, that is, when no non-contact recording medium 50 has been loaded in the medium loading portion 105, the second antenna 104 is selected via the antenna selection switch 102 (step S4), and at least one non-contact recording medium is selected from a plurality of non-contact recording media within a communicable range of the second antenna 104 based on the identification information so as to record/reproduce or delete information (step S5). In this case, a particular one non-contact recording medium is selected from the plurality of non-contact recording media within a communicable range of the second antenna 104 based on the identification information so as to record/reproduce or delete information. Alternatively, multiple non-contact recording media can be selected from a plurality of non-contact recording media within a communicable range of the second antenna 104 based on the identification information so as to simultaneously record/reproduce or delete information.

As described above, the information recording apparatus 100 has an authentication information providing capability for handling the recording apparatus containing a recording medium therein as a non-contact recording medium 50 capable of wireless data transmission, as well as allowing the operator to select one particular non-contact recording medium 50 for recording and reproducing information, so as to render the apparatus capable of recording and reproducing information even when the recording medium is removed from the camcorder body, as if the recording medium were loaded therein.

Additionally, the information recording apparatus 100 has a capability of using the same wireless transmission circuit 101 to provide identification information to the non-contact recording medium 50 in a non-contact manner. However, this identification information providing capability operates only when the non-contact recording medium 50 is loaded in the medium loading portion 105 in the apparatus body 110 of the information recording apparatus 100 and comes in proximity to the first antenna 103. The medium loading portion 105 is configured such that only one non-contact recording medium 50 can be placed in an area in proximity to first antenna 103 at a time. In this embodiment, the medium detection switch 106 then detects that the non-contact recording medium 50 is in a position in proximity to the first antenna 103, and the control circuit 107 instructs to switch the connection of the wireless transmission circuit 101 to the first antenna 103 to perform the identification information providing operation.

Whether or not the non-contact recording medium 50 is close enough to allow the operation of the information providing capability is determined based on the distance between the first antenna 103 and the non-contact recording medium 50. The distance detection is based on, for example, a mechanical switch, detection of change in capacitance, detection of change in magnetic field, detection of reflection or loss of visible or infrared light, detection of reflection or loss of an ultrasonic wave, detection of the response time of wireless communication.

By shaping the non-contact recording media 50 into a specific shape, media unable to come close enough to receive information can be rejected as unintended media. For example, the enclosure of the medium is provided with a male relief of a registered logo, while the apparatus body 110 is provided with a corresponding female depression, so that only a medium having mating relief can come close enough to receive identification information.

Figure 5:
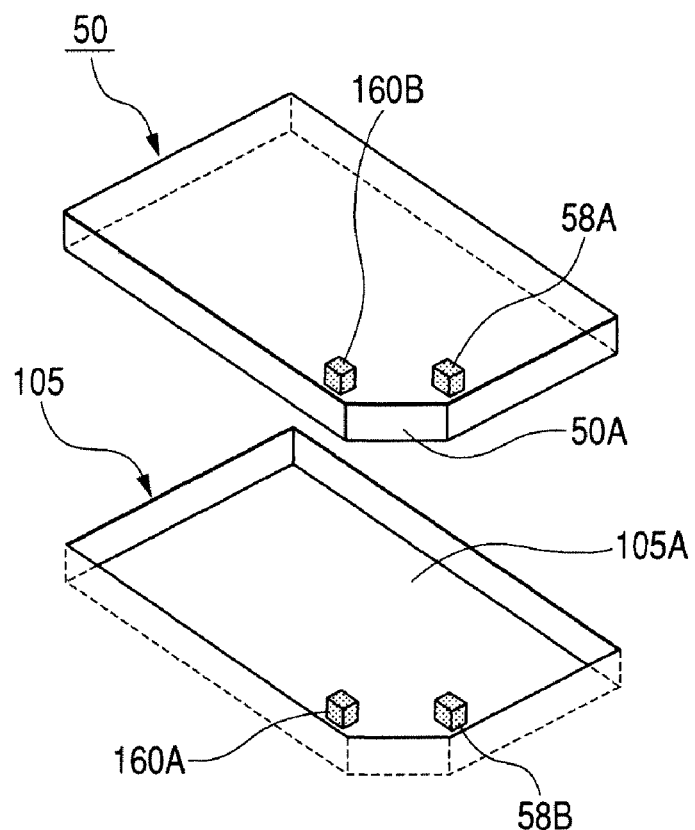
FIG. 5 is a perspective view showing the main portions of the non-contact recording medium and the medium loading portion of the information recording apparatus.

For example, as shown in FIG. 5, the non-contact recording medium 50 is externally provided with a chamfer 50A at one corner, while the medium loading portion 105 in the apparatus body 110 of the information recording apparatus 100 is provided with a recess 105A corresponding to the external shape of the non-contact recording medium 50. Since the non-contact recording medium 50 has the chamfer 50A at one corner, the apparatus body 110 only accepts a non-contact recording medium with a chamfer that fits in the recess 105A of the medium loading portion 105. A similar function can be accomplished by a pair of special projection and depression.

Hall elements 58A, 160A and magnets 58B, 160B are embedded at positions opposite to each other in the non-contact recording medium 50 and the recess 105A of the medium loading portion 105 of the information recording apparatus 100. The Hall element 58A and the magnet 58B together function as a distance sensor and form the loading detection switch 58. Similarly, the Hall element 106A and the magnet 106B together function as a distance sensor and form the medium detection switch 106.

Figure 6:
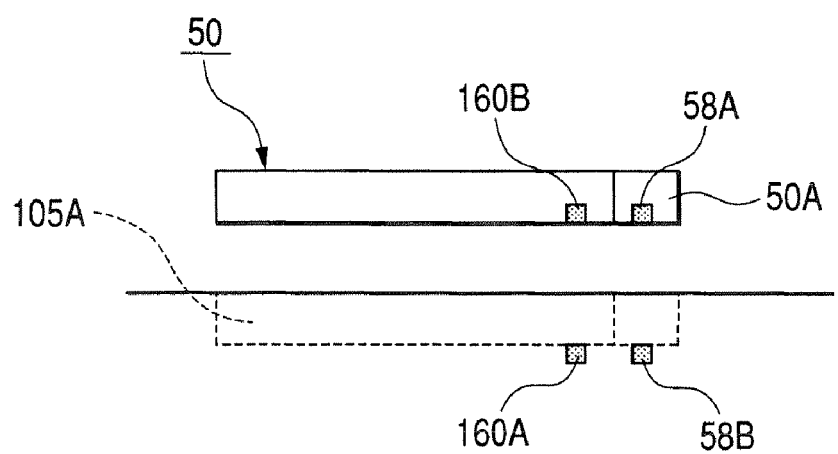
FIG. 6 shows the non-contact recording medium being loaded in the medium loading portion of the information recording apparatus.

In such a configuration, as shown in FIG. 6, the Hall elements 58A, 106A and the magnets 58B, 106B come into proximity and recognize each other only when the non-contact recording medium 50A fits in the recess 105A of the medium loading portion 105 in the apparatus body 110.

Although this embodiment is described with reference to wireless communication compliant with UWB or IEEE 802.11b as an example of wireless communication, the invention is not limited thereto, but may be applied to other wireless communication methods as long as they are capable of wireless communication between the non-contact recording medium and the apparatus body.

It should be understood by those skilled in the art that various modifications, combinations, sub-combinations and alterations may occur depending on design requirements and other factors insofar as they are within the scope of the appended claims or the equivalents thereof.

What is claimed is:

1. An information recording apparatus that records information to a plurality of non-contact recording media within a communicable range of a body of the information recording apparatus, the information recording apparatus comprising:
a medium loading portion into which a non-contact recording medium is removably loaded;
a medium detector configured to detect that the non-contact recording medium has been loaded in the medium loading portion;
a first antenna for sending and receiving information to and from the non-contact recording medium loaded in the medium loading portion;
a second antenna for sending and receiving information to and from the non-contact recording medium, when the non-contact recording medium is removed from the medium loading portion;
an antenna switch configured to switch a communication path between the first antenna and the second antenna according to a detection output from the medium detector; and
a communication unit configured to communicate with the non-contact recording medium using the first antenna or the second antenna via the antenna switch,
wherein, by communicating with the non-contact recording medium using the first antenna or the second antenna via the antenna switch, the non-contact recording medium loaded in the body is authenticated and provided with identification information via the first antenna, and when the non-contact recording media is removed from the body, at least one non-contact recording medium is selected from a plurality of non-contact recording media within a communicable range of the second antenna based on identification information provided via the second antenna to record, reproduce or delete information.

2. The information recording apparatus according to claim 1, wherein the medium loading portion is configured such that only one non-contact recording medium is removably loaded within a communicable range of the first antenna.

3. The information recording apparatus according to claim 1, wherein the communication unit selects multiple non-contact recording media from the plurality of non-contact recording media within the communicable range of the second antenna based on the identification information provided via the second antenna to simultaneously record, reproduce or delete information.

4. A non-contact recording medium to which information is recorded using an information recording apparatus that records information to a plurality of non-contact recording media within a communicable range of a body of the information recording apparatus, the non-contact recording medium comprising:
a loading detector configured to detect that the non-contact recording medium has been loaded in a medium loading portion of the information recording apparatus;
a first antenna that enables the non-contact recording medium loaded in the medium loading portion to send and receive information to and from the information recording apparatus;
a second antenna that enables the non-contact recording medium to send and receive information to and from the information recording apparatus, when the non-contact recording medium is removed from the medium loading portion;
an antenna switch configured to switch a communication path between the first antenna and the second antenna according to a detection output from the loading detector;
a communication unit configured to communicate with the information recording apparatus using the first antenna or the second antenna via the antenna switch;

an identification information storing unit configured to store identification information provided from the information recording apparatus, in an authentication process, during communication between the non-contact recording medium loaded in the medium loading portion and the information recording apparatus, via the first antenna, using the communication unit; and an information storing unit configured to record, reproduce or delete information to, from or in the non-contact recording medium selected based on the identification information provided from the information recording apparatus, during communication between the non-contact recording medium that is removed from the medium loading portion and the information recording apparatus, via the second antenna, using the communication unit.

5. A recording method for a non-contact recording medium to which information is recorded using an information recording apparatus that records information to a plurality of non-contact recording media within a communicable range of a body of the information recording apparatus, the method comprising the steps of:

determining whether or not a non-contact recording medium is loaded in the information recording apparatus and switching a communication path between a first antenna switch for proximity-range communication and a second antenna for short-range communication according to the determination;

storing identification information, in an identification information storing unit in the non-contact recording medium loaded in the information recording apparatus, the identification information being provided from the information recording apparatus in an authentication process; and performing recording, reproducing or deleting information to, from or in an information storing unit in the non-contact recording medium when the non-contact recording medium is removed from the information recording apparatus, the non-contact recording medium selected based on identification information provided from the information recording apparatus during communication between the non-contact recording medium and the information recording apparatus.

\* \* \* \* \*